April 2, 1957     O. E. CARLSON     2,787,748
BI-DIRECTIONAL ELECTRONIC MOTOR SPEED CONTROL
Filed Oct. 25, 1955
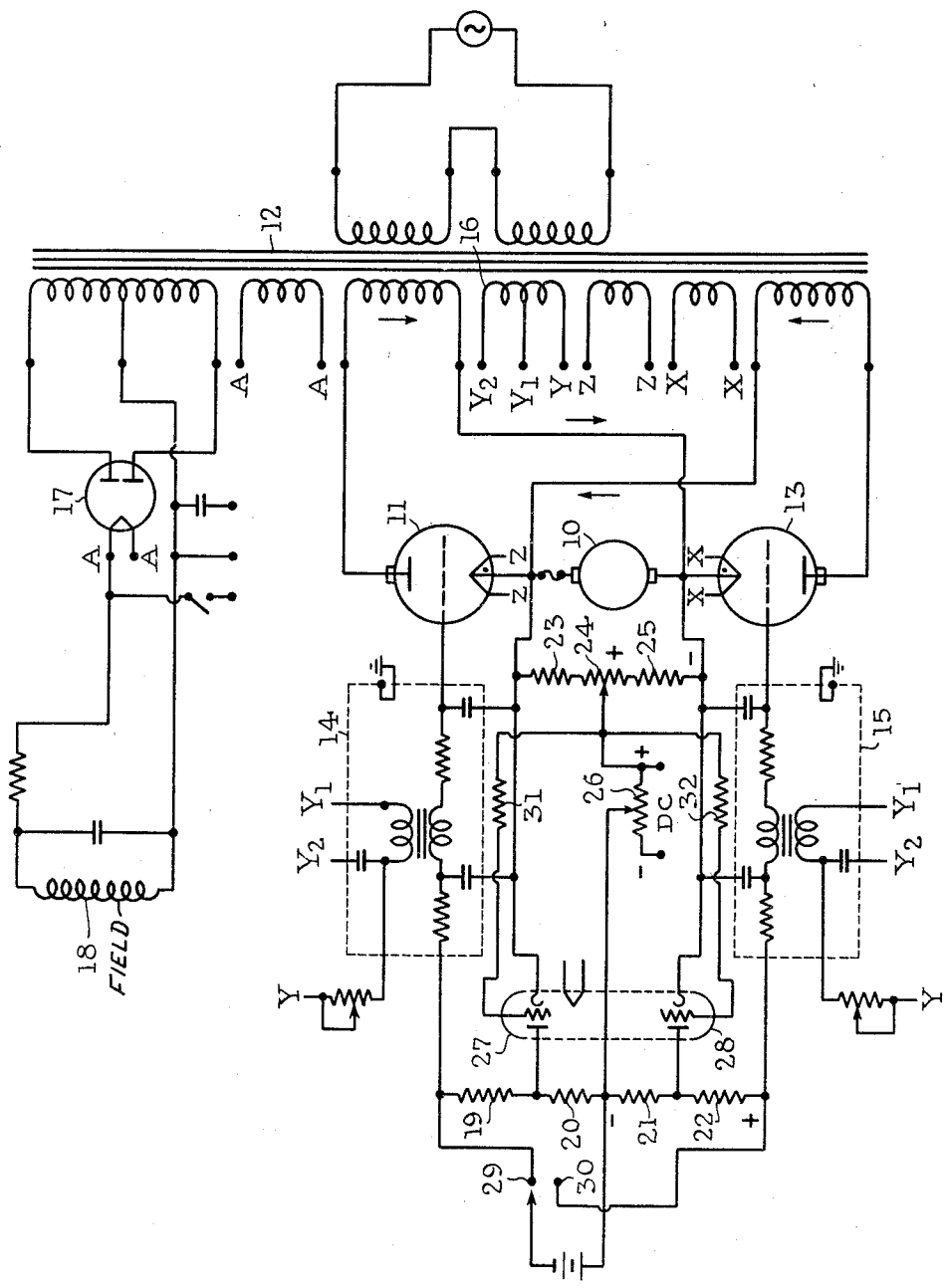
INVENTOR
Oscar E. Carlson
BY *[signature]* and Palmer
ATTORNEYS United States Patent Office 2,787,748
Patented Apr. 2, 1957

2,787,748

BI-DIRECTIONAL ELECTRONIC MOTOR SPEED CONTROL

Oscar E. Carlson, Paterson, N. J.

Application October 25, 1955, Serial No. 542,648

4 Claims. (Cl. 318—257)

This invention relates to electronic motor speed control circuits and more particularly to electronic regulating circuits of the type adapted to control a direct current motor running from an alternating current source. The present application is a continuation-in-part of my copending U. S. application, Serial No. 337,999, filed February 20, 1953, now abandoned.

Circuits falling within the scope of the above definition are well known. For a description of the basic operation, refer to U. S. patent to Edwards 1,986,627.

It is also well known to make use of a pair of thyratrons connected as half-wave rectifiers to supply current in opposite directions to the armature of a D. C. motor. Such a circuit is shown and described in the U. S. Patent to Satterlee 2,147,674. Obviously, circuits of this type provide for speed control in either desired direction of rotation of the motor. These circuits, however, are subject to one important drawback. When an instantaneous or practically instantaneous reversal of direction or rotation of the motor is desired, peak currents through both the motor armature and the thyratrons are apt to be excessive and to cause permanent damage to the tubes, the motor, or both.

It is an object of the present invention to provide a means for preventing the grids of the thyratrons from ever becoming positive with respect to their respective cathodes during periods of fast reversal of rotation of the motor.

It is a further object of this invention to provide a simplified circuit for achieving the above object with a minimum of complexity and expense.

A full understanding of the invention may be had from the following description, read in conjunction with the attached sheet of drawing, the single figure of which shows a schematic diagram of a preferred embodiment.

The armature 10 of a direct current motor is connected in series through a thyratron 11 to one secondary winding of transformer 12 and is also connected through a second thyratron 13 in series with a second secondary winding of transformer 12. Obviously either one of the thyratrons may be caused to conduct by appropriate control of their grid voltages in order to pass current through the armature 10 in either of two directions.

As is indicated in the above mentioned patent to Edwards, a preferred method of controlling the firing time of the thyratrons is to place on the grids, an alternating current voltage which is out of phase by approximately 90° with the voltage on the anodes. While this may be done in a number of known ways, the attached drawing illustrates a pair of phase shifting networks 14 and 15 driven by a center tapped secondary winding 16 of transformer 12. By superimposing on this A. C. voltage, a D. C. voltage, a rather complete control of the firing time may be had.

As is also usual in circuits of this type, a second rectifier means herein shown as a hard vacuum full-wave rectifier 17, is connected to supply direct current to the field winding 18 of the motor. A portion of the D. C. voltage output of the rectifier 17 may also be used in the control circuit. Such an arrangement is shown in the prior U. S. Patent to Wilkins 2,572,824.

Turning now to the remainder of the circuit between the armature 10 and the grids of the thyratrons 11 and 13, there is shown a series of four resistors 19, 20, 21, 22 serially connected between the grids. A second series of resistors 23, 24, 25 is connected directly across the terminals of armature 10. The electrical center of each of these two groups of resistors are connected together in series with an adjustable source of direct current voltage. As shown in the drawing, this may be simply a potentiometer 26 across a fixed voltage, the positive side of which is connected to the center tap of resistors 23, 24, 25 while the adjustable negative end is connected to the center tap of resistors 19, 20, 21, 22. This provides then, a variable D. C. bias for the thyratrons 11 and 13.

Neglecting for the moment the part played in this circuit by the triodes 27 and 28, it will be readily apparent that a direct current voltage connected to terminals 29 and 30 may be used to cause selectively thyratrons 11 or 13 to conduct. If, for example, terminal 29 is made positive with respect to terminal 30, then thyratron 11 will pass current through the armature 10 of the motor in the direction indicated and thyratron 13 will be non-conducting. If the polarity of the D. C. voltage applied to terminals 29 and 30 is then reversed, thyratron 11 will be cut-off and thyratron 13 will conduct, causing current to flow through the armature 10 of the motor in the opposite direction as indicated on the drawing. Variations in magnitude of the D. C. voltage applied to terminals 29 and 30 will, of course, determine the firing times of the thyratrons and hence the speed of rotation of the motor, while the polarity of the applied voltage will determine the direction of rotation.

In the event of an extremely rapid reversal of rotation of the motor, a rather serious difficulty in the operation of the circuit thus far described would arise. Assume that the motor is running at its rated speed in a direction governed by conduction of thyratron 11, and with terminal 29 positive with respect to terminal 30 by a potential of 265 volts. The R. M. S. anode voltage for each thyratron is 260 volts corresponding to a peak anode voltage of 369 volts with a 60 cycle input. Under these conditions and in a particular embodiment of the invention, the voltage developed across the armature 10 of the motor will be 205 volts D. C. Now, assume a practically instantaneous reversal of polarity for the reference voltage across terminals 29 and 30. The grid of thyratron 11 is then made sufficiently negative with respect to its cathode that this tube ceases to conduct. However, at the peak of the A. C. voltage on the anode of thyratron 13, that anode is positive with respect to its cathode by a potential of 369 volts plus the generated voltage of the motor armature 10 still rotating and acting as a voltage generator. The latter voltage approaches the previously developed voltage of 205 volts. This results in a total potential of approximately 574 volts across thyratron 13. Momentarily, therefore, the grid of thyratron 13 would be positive with respect to its cathode by a potential of approximately 220 volts. Obviously such conditions would cause a tremendous surge of momentary current through the thyratron 13 and the motor armature 10 which would far exceed the safe ratings for this equipment.

In order to guard against this situation, the triodes 27 and 28 are connected in the circuit with their cathodes connected to opposite sides of the armature 10 and their anodes connected to points between resistors 19 and 20 and 21 and 22, in two separate half-wave limiter circuits.

The grids of triodes 27 and 28 through resistors 31 and 32 are connected to the center point of resistor 24.

Under the same set of circumstances and with the triodes connected as described above and shown in the accompanying drawing, a very different situation arises. Under the initial conditions, that is, with the motor running at its rated speed under control of thyratron 11, triode 28 is conducting at a quiescent level, and triode 27 is biased to cut-off. Upon reversal of the D. C. voltage applied to terminals 29 and 30 as above, and prior to reversal of rotation of the motor, the anode of triode 28 becomes strongly positive with respect to its cathode and its conduction, therefore, increases accordingly. The net result is the increased drop across resistor 21, so terminal 30 is therefore prevented from becoming positive with respect to the cathode of thyratron 13. The latter tube, therefore, conducts current at a delayed firing angle to decelerate the motor at a controlled rate and then to reverse and accelerate it in the opposite direction. As the motor decelerates, its armature voltage drops and triode 28 conducts increasingly less strongly until motor reversal. Triode 28 is then biased to cut-off.

The means for placing a reversible polarity D. C. voltage across terminals 29 and 30 may take any known form. One means would be that shown in the above mentioned patent to Satterlee in which a reversible D. C. generator is connected to these terminals. Another form and one which is also shown in the Satterlee patent is to use a center tapped potentiometer. These and many others are possible and within the scope of the instant invention.

Likewise, the source of D. C. voltage for potentiometer 26 can take any one of a number of possible forms. For example, a portion of the output of rectifier 17 could be connected to this potentiometer. Equivalent means would be obvious to those skilled in the art.

From the foregoing, it will be apparent that the circuit shown and described herein will serve to control the speed and direction of rotation of a D. C. motor under widely varying load conditions. This circuit will also permit reversal of the direction of the motor without use of a polarity reversing switch and will permit sensitive and dependable control over a wide range of speed variations. Reversal of rotation may be secured rapidly without switching and with current limit circuit protection for both the motor and the thyratrons used. Controlled acceleration and deceleration are also an accomplished fact utilizing this circuit.

Obviously, the circuit is subject to wide variation in its individual elements, such as, for example, the tube types used. However, I have obtained good results with operating a ⅓ H. P. motor by using type C3J thyratrons, a type 83 field rectifier, and a dual triode such as a 6SN7. Resistors 19, 20, 21, 22 have given good results with values of 100,000, 220,000, 220,000 and 100,000 ohms, respectively.

I claim:

1. A system for controlling the speed and direction of rotation of a direct current motor running from an alternating current source, comprising in combination: a pair of grid controlled gaseous rectifiers, each connected to pass current from said A. C. source through the armature of the motor in opposite directions; means connected to apply a D. C. voltage to the field of said motor from said A. C. source; means for supplying the grids of said gaseous rectifier means with an A. C. voltage out of phase with said source; first resistance means connected in parallel with the armature of said motor; second resistance means; means connecting opposite ends of said second resistance means between the grids of said gaseous rectifiers; means affording connection of a reversible polarity D. C. voltage across said second resistance; means to superimpose a control voltage on the grids of said gaseous rectifiers; a first triode connected intermediate one side of the armature of said motor and the grid of one of said gaseous rectifiers; a second triode connected intermediate the other side of the armature of said motor and the grid of the other of said gaseous rectifiers; and means connecting the grids of said triodes to the center point of said first resistance means, the cathodes of each of said triodes being connected to said armature; whereby said triodes provide a pair of separate half-wave current limiter circuits permitting rapid reversal of the motor without overloading.

2. In a system for reversibly controlling the speed of a direct current motor running from an A. C. source which utilizes a pair of thyratrons connected to pass current through the armature of the motor in opposite directions, the combination comprising: terminal means affording connection of a reversible polarity D. C. control voltage to the grids of said thyratrons; and a pair of vacuum tubes, one connected intermediate one of said terminal means and one side of the armature of said motor, and the other connected between the other of said terminal means and the other side of the armature of said motor, the anodes of said tubes being connected to the terminals in each instance and the cathodes to the armature, to prevent, at all times, the grids of said thyratrons from assuming a voltage positive with respect to their respective cathodes.

3. In a system as defined by claim 2, said vacuum tubes comprising a pair of triodes.

4. A system for controlling the speed and direction of rotation of a direct current motor running from an alternating current source, comprising in combination: a pair of grid controlled gaseous rectifiers, each connected to pass current from said A. C. source through the armature of the motor in opposite directions; means connected to apply a D. C. voltage to the field of said motor from said A. C. source; means for supplying the grids of said gaseous rectifiers with an A. C. voltage out of phase with said source; first circuit means connected across the armature of said motor to provide an electrical neutral point thereacross; second circuit means connected between the grids of said gaseous rectifiers to provide an electrical neutral point therebetween; means for applying a D. C. voltage between said neutral points for biasing the grids of said gaseous rectifiers; terminal means affording connection of a reversible polarity D. C. voltage across said second circuit means to provide a control for firing either of said gaseous rectifiers; a first triode connected between one side of the armature of said motor and one of said terminal means; a second triode connected between the other side of the armature of said motor and the other of said terminal means, the cathode side of each of said triodes being the side connected to the armature, and the grids of said triodes being connected to said armature neutral point.

References Cited in the file of this patent

UNITED STATES PATENTS 2,147,674    Satterlee _____ Feb. 21, 1939